(12) United States Patent
Gennaro et al.

(10) Patent No.: US 7,640,432 B2
(45) Date of Patent: Dec. 29, 2009

(54) ELECTRONIC CASH CONTROLLED BY NON-HOMOMORPHIC SIGNATURES

(75) Inventors: Rosario Gennaro, Bronx, NY (US); Charles Tresser, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 1554 days.

(21) Appl. No.: 09/734,102

(22) Filed: Dec. 11, 2000

(65) Prior Publication Data

US 2002/0073318 A1 Jun. 13, 2002

(51) Int. Cl.
*H04L 9/00* (2006.01)
*H04L 9/32* (2006.01)
*G06F 7/04* (2006.01)
*H04K 1/00* (2006.01)

(52) U.S. Cl. .......................... 713/180; 713/185; 726/5; 726/17; 380/255; 705/65; 705/75; 705/76; 705/77

(58) Field of Classification Search ................. 713/180, 713/200, 193, 194; 705/64, 65, 66, 69, 76, 705/77
See application file for complete search history.

(56) References Cited

U.S. PATENT DOCUMENTS

| | | | | |
|---|---|---|---|---|
| 5,590,197 A * | 12/1996 | Chen et al. | ..................... | 705/65 |
| 5,627,893 A * | 5/1997 | Demytko | ..................... | 380/30 |
| 5,636,292 A | 6/1997 | Rhoads | | |
| 5,710,834 A | 1/1998 | Rhoads | | |
| 5,732,136 A * | 3/1998 | Murphree et al. | ............. | 705/77 |
| 5,768,385 A * | 6/1998 | Simon | ......................... | 705/69 |
| 5,815,658 A * | 9/1998 | Kuriyama | ................... | 713/200 |
| 5,832,089 A * | 11/1998 | Kravitz et al. | ................ | 705/69 |
| 5,841,866 A * | 11/1998 | Bruwer et al. | ................ | 705/66 |
| 5,878,138 A * | 3/1999 | Yacobi | ......................... | 705/69 |
| 5,893,907 A | 4/1999 | Ukuda | | |
| 5,983,207 A * | 11/1999 | Turk et al. | .................... | 705/39 |
| 5,999,625 A * | 12/1999 | Bellare et al. | ................. | 705/64 |
| 6,014,745 A * | 1/2000 | Ashe | ......................... | 713/193 |
| 6,233,685 B1 * | 5/2001 | Smith et al. | ................. | 713/194 |
| 6,237,095 B1 * | 5/2001 | Curry et al. | ................. | 713/178 |

(Continued)

FOREIGN PATENT DOCUMENTS

WO WO0060512 A1 * 10/2000

OTHER PUBLICATIONS

McAndrews, James, Making Payments on the Internet, 1997, Business Review-Federal Reserve Bank of Philadelphia, pp. 3-12.*

(Continued)

*Primary Examiner*—William R Korzuch
*Assistant Examiner*—Aravind K Moorthy
(74) *Attorney, Agent, or Firm*—Scully, Scott, Murphy & Presser, P.C.; Preston Young, Esq.

(57) ABSTRACT

A method and system for establishing and managing digital cash. This method is to emit and circulate secure electronic cash that allows to use non-homomorphic signature schemes, and avoids having to use blind signature techniques. With one specific embodiment, the method provides anonymous digital cash, and comprises the steps of providing an entity with a secure coprocessor, a user establishing a secure channel to a program running on said coprocessor, and the user sending a coin to be digitally signed to the coprocessor.

14 Claims, 2 Drawing Sheets

U.S. PATENT DOCUMENTS

| | | | |
|---|---|---|---|
| 6,298,153 B1 * | 10/2001 | Oishi | 382/186 |
| 6,311,171 B1 * | 10/2001 | Dent | 705/64 |
| 6,366,894 B1 * | 4/2002 | Everett et al. | 705/76 |
| 6,411,942 B1 * | 6/2002 | Fujimoto | 705/64 |
| 6,434,535 B1 * | 8/2002 | Kupka et al. | 705/24 |
| 6,446,052 B1 * | 9/2002 | Juels | 705/69 |
| 6,467,684 B2 * | 10/2002 | Fite et al. | 235/379 |
| 6,636,969 B1 * | 10/2003 | Jakobsson et al. | 713/180 |
| 6,675,153 B1 * | 1/2004 | Cook et al. | 705/74 |
| 7,013,296 B1 * | 3/2006 | Yemini et al. | 705/77 |

OTHER PUBLICATIONS

McAndrews, James, How will we pay on the Internet?, 1997, Consumers' Research Magazine, pp. 29-33.*

Gemmell, Peter, Traceable e-cash, 1997, IEEE, pp. 35-37.*

Goh et al, A Divisible Extension of the Brands Digital Cash Protocol: K-Term Coins Implemented Via Secret Sharing, 2000, IEEE, pp. 452-457.*

Johnson et al, Homomorphic Signature Schemes, 2002, University of California at Berkeley, pp. 1-18.*

Menezes. A., et al., "Handbook of Applied Cryptography", CRC Press, Chapter 8; pp. 25-32, 283-319.

Smith, S., et al., "Using a High-Performance, Programmable Secure Coprocessor", IBM T.J. Watson Research Center, Yorktown Heights, New York, pp. 73-89.

* cited by examiner

ELECTRONIC CASH CONTROLLED BY NON-HOMOMORPHIC SIGNATURES

BACKGROUND OF THE INVENTION

1. Field of the Invention

The present invention generally relates to a method and system to create and manage digital cash.

2. Prior Art

A review of digital cash and other forms of electronic payment systems can be found in D. O'Mahony, M. Peirce, and H. Tewari: Electronic Payment Systems (Artech House, Boston, 1997). The basic idea of electronic cash is that a digitally signed statement of value from a bank can be redeemed by the bank as no one else can produce such a statement, as long as the bank keeps track of the statements it has already redeemed. To protect the beneficiary of the statement, encryption will be used in communication, or the delivery has to be made by conventional delivery methods. This basic principle however does not allow for anonymity, which is often considered as one of the main virtues of cash. To overcome this difficulty, David Chaum (D. Chaum "*Blind Signature System*", Advances in Cryptology: Proceedings of Crypto 83, Plenum Press, New York, 1984, Pages 153-153) has proposed to use blind signature, which uses the homomorphic property of the RSA protocol for public signature.

This idea has been the starting point of actual use of electronic cash, as offered by the Mark Twain Bank of St. Louis, Mo. for some time starting October 1995. The fact that this operation was not continued is most probably due to the fact that electronic commerce (or e-commerce) was not yet developed enough. The growth of e-commerce as we witness it now will certainly ask for some forms of electronic cash to be available. It is thus important to provide ways to generate and manage electronic cash which would have all the virtues, and avoid the weaknesses, of the solutions originally offered.

One approach to address this need is to use a digital signature Sign. The main property of a digital signature Sign such as RSA which is used for blind signatures is the fact that Sign has some interesting algebraic properties:

1) it is a homomorphism, i.e., $Sign(kx)=Sign(k)Sign(x)$,
2) it is possible to create pairs r, $Sign(r)$ for a random message r. More precisely, anyone can choose $Sign(r)$ at random and then compute r as the function $Sign^{-1}$ is known publicly.

The basic idea is as follows. Customer C will choose a message x which is going to be the coin. Also, C will generate a pair, $k, Sign(k)$, for a random number k. C sends the product kx to the bank B which will compute $Sign(kx)$. B then sends $Sign(kx)$ to C, using, for instance, a public encryption scheme provided by C, or using some session key exchanged between C and B using a Diffie-Hellman session, or using some other form of communication such as delivery on a diskette transported by an armored carrier. C can then compute $Sign(x)$ by simply dividing $Sign(kx)$ by $Sign(k)$. The pair $(x, Sign(x))$ is now redeemable by B, at a value usually determined by the signature being used, and B cannot recognize C when some payee P presents $(x, Sign(x))$, as the knowledge of kx does not allow practical recognition of x nor of $Sign(x)$.

The main problem with the approach described above is that a signature scheme with properties (1) and (2) described above is clearly not secure. Indeed property (2) says that it is easy to forge signatures on random messages. Property (1) says that after seeing the signatures on two messages x1 and x2, it is easy to compute the signature on the message $x=x1x2$. In order to overcome this problem, valid messages are required to have a special "structure" (e.g., the message x must be encoded using the PKCS#1 standard for digital signature). The hope is that messages with this structure are sparse and hard to forge even given properties (1) and (2) (since messages with that structure will not appear with a significant probability). However, this is simply a hope and is not a proven mathematical property of the signature scheme or of the encoding. The drawback is that it may be possible to discover an algorithm to forge messages even when we restrict them to this structured sparse set.

A provably secure signature scheme instead has the property that even after seeing several signed messages, it is not possible to produce a different valid message. This is a mathematical property of the signature scheme which is proven under some reasonable computational assumption (say the hardness of factoring large integers). Provably secure schemes are known in the cryptographic literature, but for none of them is it known how to create a blinding mechanism.

SUMMARY OF THE INVENTION

An Object of this invention is to improve cryptography methods and systems.

Another object of the present invention is to provide a method and apparatus to create and manage electronic cash using possibly a non-homomorphic signature scheme.

A further object of this invention is to provide a mechanism to create digital cash which does not use blinding and relies on provably secure signature schemes.

Another object of the present invention is to provide a method and system to emit and circulate secure electronic cash that allows to use non-homomorphic signature schemes, and avoids having to use blind signature techniques.

A further object of this invention is to provide a method and system to emit and circulate secure electronic cash that allows to use non-homomorphic signature schemes and avoids having to use blind signature techniques, and where the generation of the electronic cash is performed using secure cryptographic hardware that protects its keys from everyone, including the owners.

These and other objective are attained with a method and system for establishing and managing digital cash. This method is to emit and circulate secure electronic cash that allows to use non-homomorphic signature schemes, and avoids having to use blind signature techniques. With one specific embodiment, the method provides anonymous digital cash, and comprises the steps of providing an entity with a secure coprocessor, a user establishing a secure channel to a program running on said coprocessor, and the user sending a coin to be digitally signed to the coprocessor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS

Figure 1:
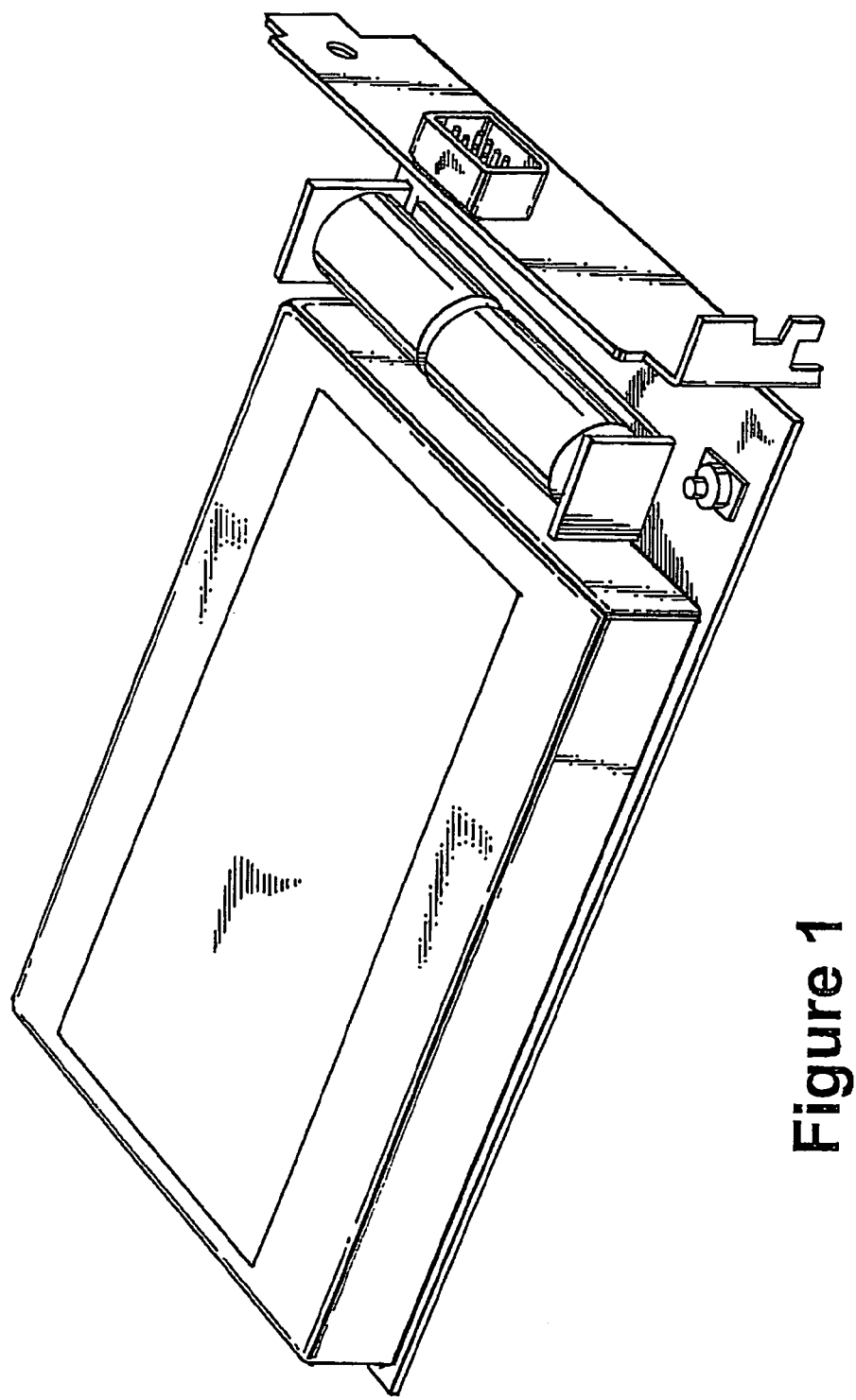
FIG. 1 illustrates an IBM 4758 PCI Cryptographic coprocessor, which may be used in the practice of this invention.

The present invention builds on a pair of technologies: (1) a secure cryptography generator such as the IBM 4758 PCI Cryptographic Coprocessor; and (2) Cryptography.

The IBM 4758 PCI Cryptographic Coprocessor:

The IBM 4758 PCI Cryptographic Coprocessor is a programmable, field upgradeable piece of secure hardware that has a general purpose computational power about equivalent to a personal computer from the early 90's. It performs high speed cryptographic operations, and provides secure key storage. It is both cryptographically secure and able to detect and protect itself against physical attacks (probe, voltage, temperature, radiation). It is in fact one of the only two devices that are Federal Information Processing Standard (FIPS) 140-1 overall 4 certified (hardware and microcode: certificate #35), the other one coming integrated in IBM 390 mainframes (the IBM CMOS Cryptographic Coprocessor: certificate #40) while the price of an IBM 4758 is about a couple of thousand dollars. The IBM 4758 is indeed a popular PCI bus interface for servers, and can serve as device driver for NT, AIX, OS/2, Linux, and OS/390.

Typical use of cryptographic coprocessors such as the IBM 4758 or some smart cards include High Speed Bulk Cryptography (for instance for digital movies, in-flight entertainment systems, secure databases, confidential video-conferences, telemedicine, telecommuting, etc.) and Security in Non Trusted Environments (for instance, for smart card personalization, electronic currency dispensers, electronic benefits transfer, server-based smart card substitutes, home banking, certification authorities, secure database key control, e-postage meters, electronic payments, secret algorithms, secure time stamps, contest winner selection, software usage metering, electronic securities trading, hotel room gaming, etc.).

Cryptography

The use of Private key/public key pairs (or SK/PK pairs; we also say public schemes) as means to encrypt or digitally sign a file or document, of secret encoding keys, and of secure hash functions (such as SHA-1, as fully specified in the Federal Information Processing Standard Publication 180-1) are now well known. A description of these techniques with directions on how to use several of their implementations can be found in "Handbook of applied Cryptography", by Alfred J. Menezes, Paul C. van Oorschot and Scott A. Vastone, CRC Press, 1997.

To fix the ideas, we recall that a digital signature scheme is used in the form of a pair of functions Sign and $Sign^{-1}$ which are inverse of each other, i.e., for a message X to be signed, $Sign^{-1}(Sign(X))=X$. The function Sign is kept secret, being known only to some legitimate owner of the signature and his/her agents. The function $Sign^{-1}$ is known publicly, and accessible for instance through the World Wide Web (WWW), through some agency specializing in providing PKI, or given away by the owner of the pair to whoever needs to check the identity of the sender and/or that a message is exactly as the owner intended it to be.

We also recall that a public encryption scheme is used in the form of a pair of functions Encr and $Encr^{-1}$ which are the inverse of each other, i.e., for a plain text X to be signed, $Encr^{-1}(Encr(X))=X$. The function $Encr^{-1}$ is kept secret, being known only to some legitimate owner of the signature and his/her agents. The function Encr is known publicly, and accessible for instance through the WWW or through some agency specializing in providing PKI, or given away by the owner of the pair to whoever wants to send the owner a secret message, or keep secret some part of the message.

Probably the most often used public schemes (to generate and use a SK/PK pair in order to allow for public encryption or digital signature) are the Rivest-Shamir-Adleman (RSA) protocols. Several other methods could also be used (see, e.g., the "Handbook of applied Cryptography"). In the case when the functions Sign and $Sign^{-1}$ (or $Encr^{-1}$ and Encr) are produced according to the RSA protocol, it is now preferred to use at least 1024 bits for X and Sign(X) (the formerly often used 512 bits are no more considered as secure).

The RSA scheme works as follows. The signer (let us call him Bob) chooses two large primes P, Q (say 512 bits long) and sets n=PQ. Then he chooses a small prime number e which is relatively prime to both P-1 and Q-1. This property guarantees that there exist a number d such that for any k, $k^{ed}$ mod n=k mod n.

Bob sets (n,e) as his public key and keeps d secret as well as P and Q. The signature for a message X is $Sx=Sign(X)=X^d$ mod n.

And it can be verified by checking that $Sx^e=X$ mod n.

Clearly the RSA scheme has the homomorphic property Sign(kx)=Sign(k)Sign(x).

Also it is possible to generate random pairs (r,Sign(r)): simply choose a random integer R smaller than n and then set $R=Sign(r)$, and $r=R^e \mod n$.

As discussed earlier, these are the properties that allow for blind signature. Mathematically, the blind signature protocol using RSA works as follows. Alice wants Bob to sign message x but without him knowing that he signed it for her. This is accomplished in three easy steps:

1. Alice chooses a blinding factor, k, as a random number between 1 and n, and blinds x by computing $U=xk^e$ mod n.
2. Bob signs U as $U^d=(xk^e)^d \mod n = x^d k^{ed} \mod n = x^d k \mod n$.
3. Alice unblinds $U^d$ by computing the signature of x as $Sign(x)=U^d/k=(x^d k \mod n)/k=x^d \mod n$.

In electronic cash application, Bob is the bank B, and will need to keep track of all pairs (x,sign(x)) which have been redeemed. To keep databases bounded, expiration dates will be associated to any signature. Notice that in order for this to be a valid blinding mechanism, x must follow some special structure (for example, follow the PKXS#1 standard for digital signatures). Pairs (x,Sign(x)) in which x does not follow the prescribed structure are not valid coins (otherwise Alice could easily generate coins on her own).

Golwasser, Micall, Rivest ("*A Digital Signature Scheme Secure Against Chosen-Message Attack*", SIAM J. On Computing, Vol. 17, no. 2, pp. 281-308); and Dwork, Naor ("*An Efficient Existentially Unforgeable Signature Scheme and Its Applications*", J. Of Cryptology, Vol. 1, No.3, pp. 187-208) among others, have recognized that the homomorphic property of RSA is a potential source of weakness. They also proposed new signature schemes that are provably secure, i.e., in which it is provably impossible (under some reasonable computational assumption) to forge signatures. Other, more efficient, provably secure protocols have been proposed, for instance by Gennaro, Halevi, Rabin ("*Secure Hash-and-Sign Signatures Without the Random Oracle*", EUROCRYPT'99, pp. 123-139, Springer LNCS vol. 1592) or Cramer, Shoup ("*Signature schemes based on the Strong RSA Assumption*", Proc. 6th ACM Conf. on Computer and Communications Security, 1999).

As a message may contain much more information than the length of the keys, several methods can be used, possibly concurrently, as is well known in the art. For instance, one can split the message in several pieces, some or all of which will be signed, or one can compress the information, for instance using a secure hash function, or one can select a subset of the information, etc. Clearly, the protocol which is chosen has to be known publicly if one desires to use public key cryptography.

Notice that even if one wishes to uses the benefits of public key cryptography, it may be useful to also hide secret information in the messages, so that one could recognize that someone has succeeded in breaking the keys being used. As usual in the art, it is advisable to change the keys being used every so often, depending on the application, and to keep a list of former keys.

Another important enabler of secure electronic communication is the possibility to exchange secret keys while exchanging only messages which can be understood by third parties. Several protocols have been created to this effect such as Diffie-Hellman.

The preferred embodiment of the present invention uses a secure cryptographic generator such as the IBM 4758 PCI Cryptographic Coprocessor to create and manage electronic cash using possibly a non-homomorphic signature scheme. Preferably, the secure cryptography generator has the following properties, something which can be achieved by the 4758:

Prop1: it has a public key signature
(Sign1,Sign1$^{-1}$), whose secret part Sign1 cannot be obtained by anyone, except possibly by very special attacks which cannot be unnoticed, (no such attack has been proven to succeed so far on the 4758), Prop2: it can perform standard encryption, say some list List1 of them, once provided keys to that effect; once provided an encryption scheme ES in List1 and an associated key k(ES), and a request to sign a certificate in some prescribed format Cert, corresponding to an amount that belong to a list List2, it will only accept to provide the signature Sign (Cert) after encryption using the method ES and the key k(ES)—the clear form of Sign(Cert) cannot be obtained by anyone, except by very special attacks which cannot be unnoticed (again, no such attack has been proven to succeed so far on the 4758).

Some extra properties can be imposed for some embodiments of the invention, some of which will be listed later, but Prop1 and Prop2 are the basic properties we assume each time we speak of a secure cryptography generator.

When ordering cash, customer C communicates to the secure cryptography generator SCG at the bank B (preferably using some secure channel on which both SCG and B can read), its own public encryption scheme (method belonging to List1, and key, all together denoted as Encr2), and orders some cash amount, with a description of the way to cut the amount into units, in a way compatible with List2 (for instance List2 will comprise all amounts available with regular coins and bills in the currency of interest to the customer). Each unit, Unit, is signed by the secure cryptography generator, and the signature Sign1(Unit) is then encrypted as Encr2 (Sign1(Unit)) by SCG using the customer's public encryption scheme.

The SCG also computes Encr2(Unit). Besides the value, Val(Unit), of the unit, and preferably an expiration date, Exp (Unit), Unit comprises a large random number generated by SCG, in such a way that the same number will never reappear in further transactions, and possibly a secret version of that number provided by SCG, using a very secure method such as a one time pad. The SCG then communicates the quadruple (Val(Unit), Exp(Unit), Encr2(Unit), Encr2(Sign1(Unit))

to the computer system of the bank. After payment of Val (Unit) and fees, B communicates the quadruple to C, and keeps it in its database until some expiration date that C knows and accepts beforehand (unused electronic cash can be substituted back to regular cash, or to electronic cash with later expiration date, possibly for a fee). The communication from SCG to C through B allows to guarantee the delivery of the quadruple in case of crash of one of the machines involved and/or the communication lines. It also allows C to ask for a copy of the quadruple if it is later lost before use.

C will later use the electronic cash by offering the pair (Unit,Sign1 (Unit)) as payment. The recipient of the pair can check with B the validity of the pair. Once a pair has been redeemed, Unit is kept in the database of B until expiration of its validity, to avoid repeated use by C or any other party.

Notice that when a recipient presents (Unit,Sign1 (Unit)) to B for credit, it is not possible for B to link this signed coin to the customer C who withdrew it in the first place. Indeed at withdrawal time, all the bank B saw was the encrypted value Encr2(Unit), Encr2(Sign(Unit)) and this does not allow in practice recognition of the decrypted values.

Traditional electronic cash management functions, such as replacement of electronic cash coming close to expiration by an electronic wallet held at C's location can be used as with former forms of electronic cash.

The advantages of the present method comprises the following properties:

any signature scheme, in particular provably secure ones such as Cramer-Shoup, can be used for Sign1.

supplementary encryption, possibly more secure or more efficient than public key, can be used by the SCG, which is useful in particular for large value units, the same signature can be used for different amounts as Unit may allow for this freedom, within List2, the bank is better protected from possibly corrupt employees.

One of the important modifications which can be made is to use multiple signatures, provided by some set of SCGs instead of a single one. For instance, five machines could sign, and the electronic cash would be accepted as soon as three signatures at least are legitimate.

Besides examining the pairs (Unit,Sign1(Unit)) as unique verification, B can also be asked to accept Unit as one it has produced. This has the advantage of extra security for B. This step cannot be done if the SCG is destroyed, but identically programmed backups can be provided, and this is an extra step of security anyhow.

Also, although perhaps less preferred, the SCG may be authorized to print out the list of Units it has generated and their signatures using Sign1, after a sufficient number of operations have been made. In fact, several SCG's could arrange to print out their combined lists every so often.

Figure 2:
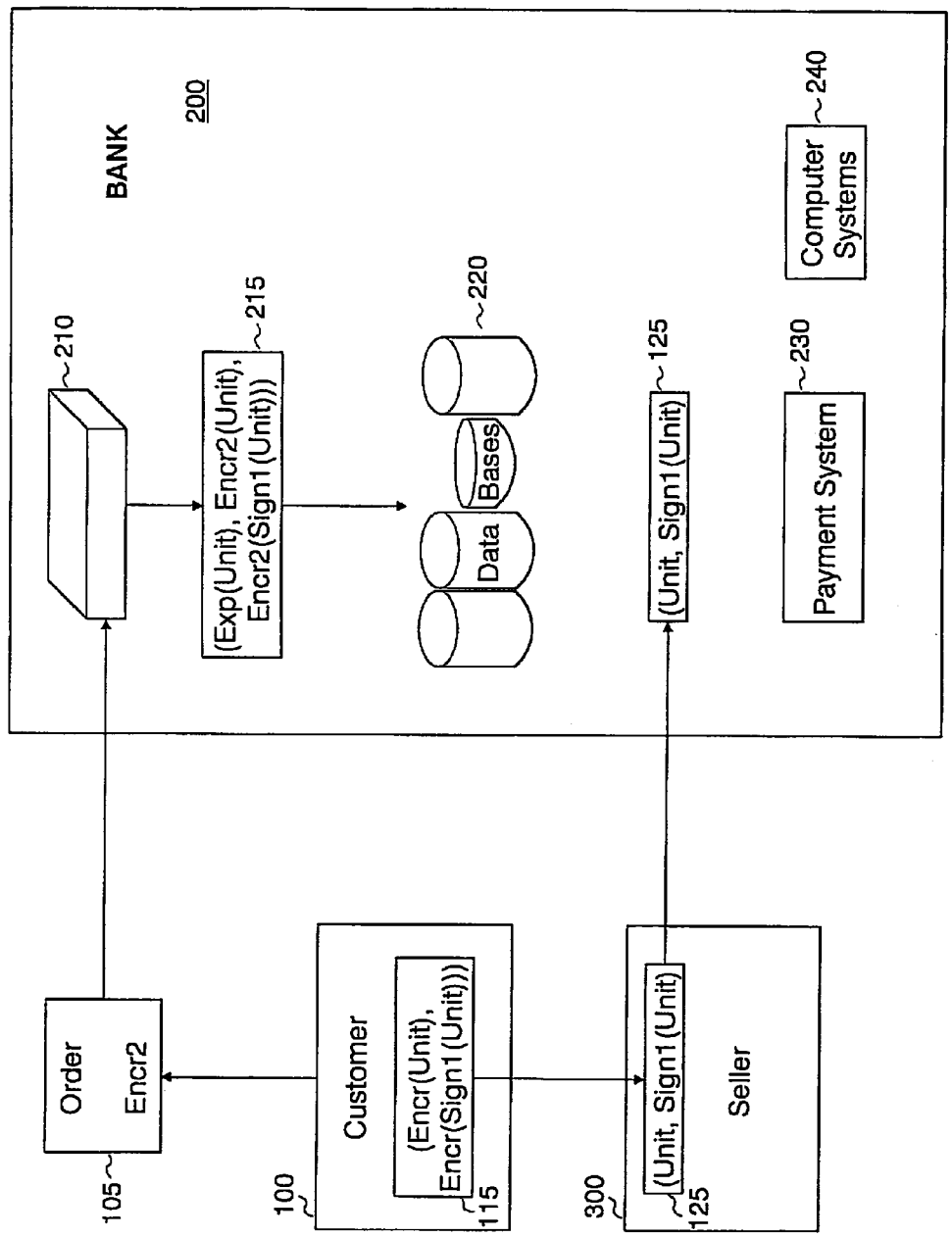
FIG. 2 is a block diagram that also represents the main flows needed for the preferred embodiment of the present invention.

With reference now to FIG. 2, at 100 we have represented the customer C, at 200 we have represented the bank B, which has one or more secure cryptography generators (SCG), possibly in the form of 4758 machines, at 210, one or more databases at 220, one or more payment systems at 230, one or more computer systems at 240, at 300 we have represented some seller with whom C will want to use the electronic cash.

The bank acquires the SCG's from some vendor, such as IBM for the IBM 4758. The machines may have property Prop3 below, besides Prop1 and Propr2:

Prop3: it has a public key encryption scheme (Encr1, Encr1$^{-1}$), whose secret part Encr1$^{-1}$ cannot be obtained by anyone, except possibly by very special attacks which cannot be unnoticed (once more we recall that, so far, no such attack has been proven to succeed so far on the 4758).

This will allow several machines to have the same keys without the keys to be compromised. The machines can also this way share one time pads, and other cryptographic function. Instead of Prop3, the machines can also communicate by building session key, for instance using the Diffie-Hellman protocol. When we speak of a SCG, we speak either of a single machine, or a series of them working in a coordinated way, as a multi-component single machine. The invention does not depend on the distinction between these two cases.

When the customer wants to buy electronic cash from B, it composes a message 105 comprising
1. the description of the order, according to some format communicated or posted by B,
2. the public key of its own public key encryption scheme (together with the designation of that scheme: C will check that this scheme belongs to those in List1 that can be handled by the bank's SCG).

C then sends this message to the bank, and it reaches the SCG at 210.

The SCG then generates the quadruple (Val(Unit), Exp(Unit), Encr2(Unit), Encr2(Sign1(Unit))) which is stores in the database 220.

After C pays at 230, the value Val(Unit), or a collection of them, depending on the original order 105, B sends to C the pair (Encr2(Unit),Encr2(Sign1(Unit)))

at 115. From this pair C (and C only in a reasonable time) can compute the clear pair (Unit,Sign1(Unit))

at 125 that will later be used, e.g., with some seller at 300. When the seller, or whoever else, is proposed the pair 125 as payment, it will check validity with B. B will use computer system 240 to check the cryptographic validity of the message, and database 220 to check that the Unit has not yet been used. If the pair is valid, payment is made to 300: for instance its account belonging to 300 is made. B then store Unit in the database until expiration at least.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of providing anonymous digital cash, the method comprising:
   providing an entity with a secure co-processor;
   a user establishing a secure channel to a program running on said coprocessor;
   the user sending an unsigned coin to be digitally signed to the coprocessor using any secure digital signature algorithm; and
   said co-processor forming a copy of the unsigned coin;
   signing the unsigned coin with a non-homomorphic signature; and
   said co-processor encrypting the signed coin and encrypting the copy of the unsigned coin using a public key of a given encryption scheme having said public key and a private key;
   sending back to the user both the encrypted copy of the signed coin and the encrypted copy of the unsigned coin, the user having the private key of said given encryption scheme, wherein the user then using said private key to decrypt both the signed and unsigned copies of the coin, and using the pair of signed and unsigned copies of the coin as a unit as digital cash for payment to a recipient while keeping the identity of the user unknown to the coprocessor.

2. A method according to claim 1, further comprising the steps of:
   the processor providing a signature to authenticate;
   the user using said encrypted signed coin for payment to a merchant; and
   the merchant returning the encrypted signed coin to the entity for credit to an account of the merchant.

3. A method according to claim 2, wherein:
   the communicating step includes the step of the customer sending to the generator the public key of the encryption scheme; and
   the step of using the secure cryptography generator includes the step of using the public key to encrypt the signature on the signed coin.

4. A method according to claim 3, wherein:
   the signing step includes the step of using a non-homomorphic signature scheme to sign the coin;
   the non-homomorphic signature scheme includes a private key and a public key; and
   the step of using the non-homomorphic signature scheme includes the step of using the private key of the non-homomorphic signature scheme to sign the coin.

5. A method according to claim 1, wherein the public key of said given encryption scheme is sent to the secure co-processor by the user.

6. A method of creating and managing electronic cash, comprising the steps:
   a customer communicating to a secure cryptography generator of a bank (i) a given encryption scheme having a public key and a private key, and a (ii) cash amount;
   establishing an unsigned unit representing the cash amount and a copy of the unsigned unit;
   signing the unsigned unit with a non-homomorphic signature to enable the customer to use the electronic cash while keeping the identity of the customer unknown to a coprocessor;
   the bank using the secure cryptography generator to encrypt a signed unit and the copy of the unsigned unit using the public key of said given encryption scheme;
   storing in a database the encrypted signed unit and a value for the unit;
   transmitting back to the customer an encrypted copy of the signed unit and an encrypted copy of the unsigned unit;
   the customer using the private key of said given encryption scheme to decrypt both the encrypted signed unit and the encrypted unsigned unit to obtain the signed unit and the unsigned unit;
   said customer using the decrypted pair of signed and unsigned copies of the coin as a unit as a payment to a recipient; and
   said recipient presenting the pair of signed and unsigned copies of the coin to the bank for credit.

7. A method according to claim 6, further including the steps of:
   establishing an expiration date for the signed encrypted unit; and
   storing the expiration date in the database.

8. A method according to claim 6, wherein the signing step includes the step of using the secure cryptography generator to sign the unit.

9. A system for creating and managing electronic cash, comprising the steps:
   a secure cryptography generator, including means for receiving from a customer (i) a cash amount, and (ii) a given encryption scheme having a public key and a private key;
   means for establishing a unit representing the cash amount and an unsigned copy of the unit;

means for signing the unit with a non-homomorphic signature to enable the customer to use the electronic cash while keeping the identity of the customer unknown to a coprocessor;

wherein the secure cryptography generator encrypts both the signed unit and the unsigned copy of the unit using the public key of said given encryption scheme;

a database for storing the encrypted signed unit and a value for the unit;

means for transmitting back to the customer both the encrypted copy of the signed unit and the encrypted copy of the unsigned unit;

means for the customer using the private key of the given encryption scheme to decrypt both the encrypted signed unit and the encrypted unsigned unit to obtain the signed unit and the unsigned unit, wherein the customer then uses the pair of the signed and unsigned copies of the coin as a unit as a payment to a recipient.

10. A system according to claim 9, further including means for establishing an expiration date for the signed encrypted unit, and wherein the expiration date is stored in the database.

11. A system according to claim 9, wherein the secure cryptography generator includes means for signing the unit.

12. A program storage device readable by machine, tangibly embodying a program of instructions executable by the machine to perform method steps for creating and managing electronic cash, said method steps comprising:

using a secure cryptography generator of a bank to receive from a customer (i) a given encryption scheme having a public key and a private key, and (ii) a cash amount;

establishing an unsigned unit representing the cash amount and a copy of the unsigned unit;

signing the unit with a non-homomorphic signature to enable the customer to use the electronic cash while keeping the identity of the customer unknown to a coprocessor;

using the secure cryptography generator to encrypt signed unit and the copy of the unsigned unit using the public key of said given encryption scheme;

storing in a database the encrypted signed unit and a value for the unit;

transmitting back to the customer an encrypted copy of the signed unit and an encrypted copy of the unsigned unit;

the customer using the private key of said given encryption scheme to decrypt both the encrypted signed unit and the encrypted unsigned unit to obtain the signed unit and the unsigned unit;

the customer using decrypted pair of the signed and unsigned copies of the coin as a unit as a payment to a recipient; and the recipient presenting the pair of signed and unsigned copies of the coin to the bank for credit.

13. A program storage device according to claim 12, wherein said method steps further include the steps of:

establishing an expiration date for the signed encrypted unit;

storing the expiration date in the database.

14. A program storage device according to claim 12, wherein the signing step includes the step of using the secure cryptography generator to sign the unit.

* * * * *

UNITED STATES PATENT AND TRADEMARK OFFICE
CERTIFICATE OF CORRECTION

PATENT NO. : 7,640,432 B2
APPLICATION NO. : 09/734102
DATED : December 29, 2009
INVENTOR(S) : Gennaro et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1848 days.

Signed and Sealed this

Ninth Day of November, 2010

David J. Kappos
*Director of the United States Patent and Trademark Office*